United States Patent

Mealey et al.

[11] Patent Number: 5,958,049
[45] Date of Patent: Sep. 28, 1999

[54] OPERATING SYSTEM DEBUGGER USING KERNEL AND DYNAMIC EXTENSION WITH DEBUGGER DRIVERS TO SUPPORT DIFFERENT OUTPUT DEVICES

[75] Inventors: Bruce Gerard Mealey, Austin; Randal Craig Swanberg, Round Rock; Michael Stephen Williams, Austin, all of Tex.

[73] Assignee: International Business Machines Corporation, Armonk, N.Y.

[21] Appl. No.: 08/818,986

[22] Filed: Mar. 17, 1997

[51] Int. Cl.$^6$ ........................................ G06F 9/445
[52] U.S. Cl. .................... 713/1; 713/2; 395/704; 395/712; 395/681; 714/38
[58] Field of Search ................... 395/712, 500, 395/681, 651, 652, 653, 704; 713/1, 2; 714/38

[56] References Cited

U.S. PATENT DOCUMENTS

| | | | |
|---|---|---|---|
| 5,386,561 | 1/1995 | Huynh et al. | 395/673 |
| 5,394,547 | 2/1995 | Correnti et al. | 395/712 |
| 5,581,766 | 12/1996 | Spurlock | 713/2 |
| 5,640,562 | 6/1997 | Wold et al. | 395/652 |
| 5,689,684 | 11/1997 | Mulchandani et al. | 395/500 |
| 5,802,365 | 9/1998 | Kathail et al. | 395/681 |
| 5,815,731 | 9/1998 | Doyle et al. | 710/10 |

*Primary Examiner*—Kenneth S. Kim
*Attorney, Agent, or Firm*—Richard A. Henkler; Jack V. Musgrove; Andrew J. Dillon

[57] ABSTRACT

A method of using a debugger for a computer operating system by providing a statically bound debugger driver which can be used early in the boot process, and further providing one or more dynamic debugger drivers which can be loaded after system initialization. The core portion of the operating system, such as the kernel for a UNIX-type workstation, makes a determination of whether any hardware device is connected to the computer that is of the type of debugger devices supported by the statically bound driver; if so, then the debugger can be used early in the boot process, but if not, provision is made for calling the dynamic debugger driver from some other portion of the operating system software, such as from the boot filesystem or PAL. The dynamic debugger driver may be selected from a plurality of dynamic debugger drivers, the particular selected dynamic debugger driver being associated with the particular hardware device that is actually connected to the computer. The computer's firmware may be designed to detect whether a hardware debugger device is connected to the computer that is of the appropriate type, so the firmware can pass this information to the core portion of the operating system. This approach simplifies testing of the operating system by allowing for the temporary connection of a debugger device which is supported by the statically bound driver.

14 Claims, 2 Drawing Sheets

OPERATING SYSTEM DEBUGGER USING KERNEL AND DYNAMIC EXTENSION WITH DEBUGGER DRIVERS TO SUPPORT DIFFERENT OUTPUT DEVICES

BACKGROUND OF THE INVENTION

1. Field of the Invention

The present invention generally relates to computer systems, and more particularly to a method of providing a debugger for a computer operating system.

2. Description of the Prior Art

The basic structure of a conventional computer system 10 is shown in FIG. 1. The heart of computer system 10 is a central processing unit (CPU) or processor 12 which is connected to several peripheral devices, including input/output (I/O) devices 14 (such as a display monitor and keyboard) for the user interface, a permanent memory device 16 (such as a hard disk or floppy diskette) for storing the computer's operating system and user programs, and a temporary memory device 18 (such as random access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor.

Computer system 10 also includes firmware 24 whose primary purpose is to seek out and load an operating system from one of the peripherals (usually permanent memory device 16) whenever the computer is first turned on. The process of seeking out and loading the operating system is referred to as "booting" the computer. Computer system 10 may be designed to allow firmware 24 to initialize (or re-initialize) a operating system without turning the computer off and back on again (a "soft" boot). Firmware 24 is essentially a series of machine instructions which are typically stored in a read-only storage (ROS) device, such as read-only memory (ROM). After power to computer system 10 is turned on (or a soft boot command has been received), processor 12 begins to execute the firmware instructions and seeks out an operating system. If an operating system is found, it is loaded into temporary memory 18. Thereafter, the operating system allows other application layers to be added, i.e., user software programs. In this manner, a given computer hardware construction can be adapted to run a variety of operating systems and user applications.

The foregoing description generally applies to any type of operating system, including two popular operating systems known as MSDOS and UNIX (MSDOS is a trademark of Microsoft Corp.; UNIX is a trademark of UNIX System Laboratories), but the present invention has particular application to UNIX. UNIX is a multi-user, multi-tasking operating system which is available from a variety of sources with different versions. These include, among others, System V (American Telephone & Telegraph), AIX (International Business Machines) and Mach (NeXT Computers). FIG. 2 illustrates a typical boot image 26 that is loaded as a UNIX operating system. Boot image 26 includes a base kernel portion 28 and a boot filesystem portion 30. Kernel 28, which is the core of the operating system, acts as the intermediary between user programs and hardware devices and includes, among other things, device drivers. Boot filesystem 30 is the RAM-based file system that provides supplemental features of the operating system such as user commands to manipulate computer objects, such as files, directories and symbolic links. When firmware 24 sees boot image 26 (such as on a floppy diskette, hard disk CD-ROM disk), it transfers control to that operating system (kernel 28) after loading it.

A given operating system can be adapted to run on various types of hardware platforms. With some operating systems, such as MSDOS, the operating system is fairly independent of the hardware platform, i.e., a given copy of the MSDOS operating system can be used to boot computers manufactured by many sources, since the hardware architecture and BIOS (basic input and output system) functions remain constant from manufacturer to manufacturer. Other operating systems, like UNIX, are less portable due to significant differences between the various types of hardware that have been designed to run UNIX. In this regard, boot filesystem 30 includes information that is hardware dependent, such as the PAL (Portability Assist Layer, or Platform Abstraction Layer), which contains the specific instructions for communicating with the particular hardware devices of a given manufacturer.

One area where hardware dependencies can create difficulties is in "debugging" of the operating system. A "bug" is a software error in the operating system, and debugging refers to the process of identifying the error, usually by examining the values in various processor registers or memory addresses. Every operating system has a debugger program. Some minimum hardware support is required for debugging, such as for a display console which is typically connected to the computer system via a serial port. In a UNIX-type operating system, software support for the console can be provided by binding a static debugger driver in the kernel, as shown in FIG. 2. If this is done, however, the kernel contains system-specific code that may need to be modified if the system is ported to a system architecture having a new I/O subsystem, such as a different display device or keyboard. This rebinding the kernel presents problems in manufacture and distribution of operating system media.

One technique for removing hardware dependence for debugging is by providing a dynamically loaded driver for the debugger. As shown in FIG. 3, a UNIX-type operating system can implement such a technique by providing a dynamic debugger driver in the boot filesystem, that is, in the PAL. The primary problem encountered with this approach is that the computer operator may want or need to debug the operating system at a time prior to loading of the PAL (i.e., during system initialization). Since the debugger is not available until late in the boot process, millions of instructions can pass before the output of the debugger can be examined (viewed on the console). It would, therefore, be desirable and advantageous to devise a method of providing a model-specific operating system debugger without limiting the hardware that the kernel can run on. It would be further advantageous if the method could allow delay of debugger functionality to a later time when debugger support can be added.

SUMMARY OF THE INVENTION

It is therefore one object of the present invention to provide an improved operating system for a computer.

It is another object of the present invention to provide such an operating system having a debugger and software support for the debugger in the form of a hardware-specific (I/O) driver.

It is yet another object of the present invention to provide support for the operating system debugger without requiring that the core portion of the operating system include hardware-specific code.

The foregoing objects are achieved in a method of providing software support for a hardware device which is connected to a computer and used in debugging an operating system, generally comprising the steps of loading a core portion of the operating system onto the computer, the core portion of the operating system including a default driver for supporting a first type of debugger devices, and thereafter determining whether any hardware device which is connected to the computer is of the first type of debugger devices and, if not, loading a dynamic debugger driver (or a separate set of interfaces) for the hardware device. The type of hardware present may be determined by, e.g., attempting a load/store operation to a known I/O address of the default hardware; if an exception occurs, it is known that the additional support must be loaded. Additional portions of the operating system may be loaded onto the computer to provide other hardware-specific components. The dynamic debugger driver may be selected from a plurality of dynamic debugger drivers, the particular selected dynamic debugger driver being associated with the particular hardware device that is actually connected to the computer. The computer may be equipped with firmware that can detect whether a hardware device is connected to the computer that is of the first type of bugger devices, so the firmware can pass information to the core portion of the operating system regarding whether any hardware device connected to the computer is of the first type of debugger devices. This information may alternatively be passed by running a program on the computer which determines whether a hardware device is connected to the computer that is of the first type of debugger devices, prior to loading of the operating system. The foregoing process makes it easier to test an operating system by temporarily connecting to the computer a debugger device which is of the first type of debugger devices, prior to the determining step. In the embodiment wherein the computer is a UNIX-type workstation, the step of loading the core portion of the operating system includes loading a kernel into a memory device of the computer, the kernel having the default driver bound thereto, and the step of loading another portion of the operating system includes loading a boot filesystem into the memory device of the computer, the boot filesystem having the other hardware-specific components. In this manner, a vendor can preserve a platform-independent kernel that has the potential to provide kernel debugging prior to any loadable support, but that still allows replacement of the static/default driver for debugging of the kernel after loadable hardware support has been added.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF THE PREFERRED EMBODIMENT

Figure 1:
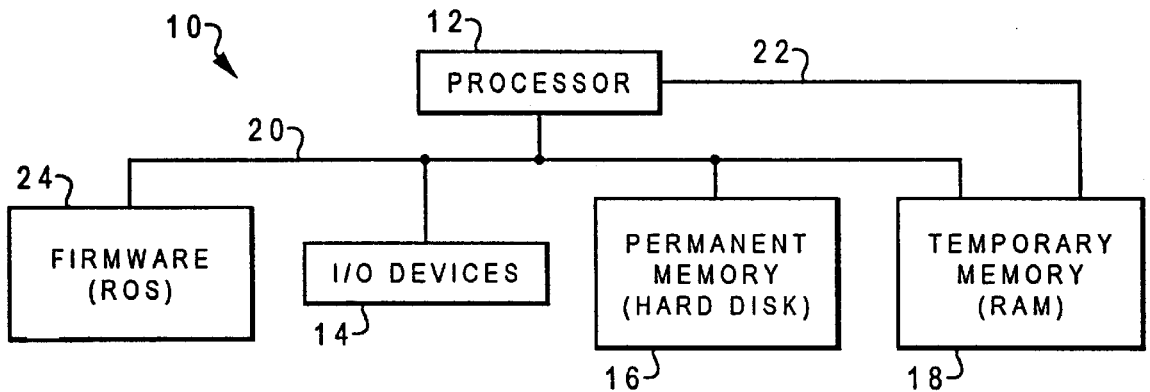
FIG. 1 is a block diagram of a conventional computer system.
Figure 2:
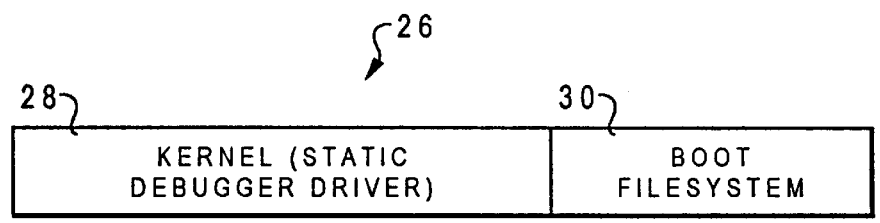
FIG. 2 is a representation of a prior art UNIX boot image.
Figure 3:
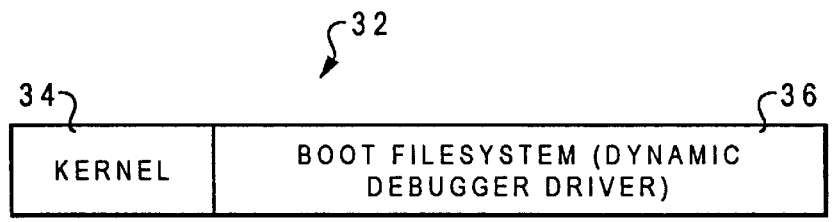
FIG. 3 is a representation of another prior art UNIX boot image.

The present invention is directed to a method of loading an operating system (OS) on a computer which has particular hardware (e.g., a display console) used for debugging the OS. The computer system's hardware may include the various components shown in FIG. 1, but the computer system is not necessarily conventional, i.e., it could include new hardware components as well, or have a novel interconnection architecture for existing components.

Figure 4:
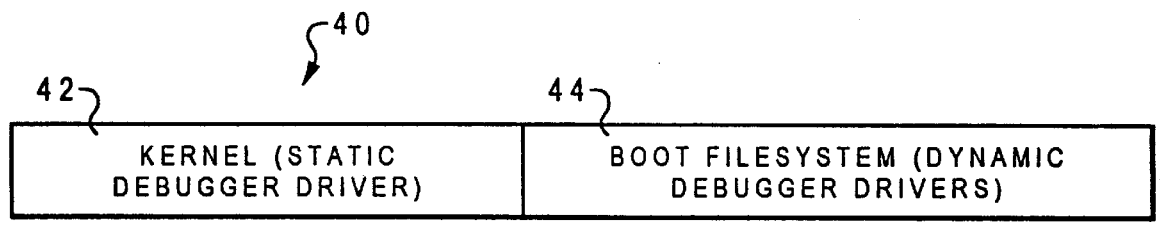
FIG. 4 is a representation of a boot image according to the present invention which is adapted for use with a UNIX-type workstation.

With reference now to FIG. 4, there is depicted a representation of one embodiment of an operating system according to the present invention, in the form a boot image 40 which is adapted for use with a UNIX-type workstation. Boot image 40 includes a core portion (kernel) 42 having a static debugger driver, and a supplementary portion (boot filesystem) 44 having a dynamically loadable debugger driver (one component in the PAL). The static debugger driver which is bound with kernel 42 is used as a default driver for the OS debugger, which allows the debugger to be available from the earliest part of system initialization. If this default driver is not appropriate for the particular type of hardware platform that is loading the OS, then the debugger instead loads the dynamic debugger driver in boot filesystem 44.

Figure 5:
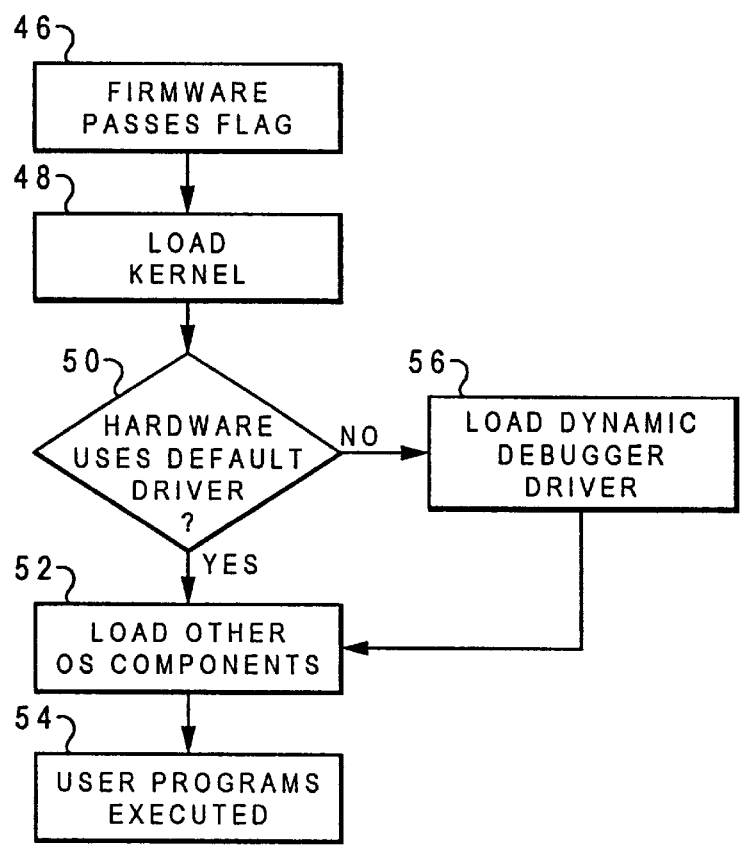
FIG. 5 is a flow chart depicting the basic boot sequence according to the present invention, using either a static (default) debugger driver or a dynamically loaded debugger driver.

This process may be carried out using instructions passed from the firmware, as shown in FIG. 5. The firmware can pass a flag which is used by the kernel to determine whether the debugger device (console) can be supported by the statically bound driver (46). After the firmware passes control, the system is initialized, i.e., kernel 42 is loaded (48), and it then determines whether to use the default driver based on the flag that is passed from the firmware (50). If so, then the operating system continues to load normally, i.e., the remaining components of the OS in boot filesystem 44 are loaded (52), except the dynamic debugger driver is not loaded as it is not needed. The operating system then turns control over to user applications (54). If kernel 42 determines that the default debugger driver is not suitable for the debugger device connected to the computer system, then the appropriate dynamic debugger driver is loaded when the other OS components are loaded (56).

The foregoing method can also be accomplished without using firmware, e.g., the kernel can probe for other indicia, such as specific identification or version registers.

While this approach still leaves the possibility that the debugger driver will be loaded later in the boot process if the computer does not have a debugger device that is compatible with the statically bound debugger driver, it at least provides some means for early debugging in those situations where a compatible debugger device is present. More importantly, this capability can be advantageously used by providing a debugger device, supported by the static driver, that is removably connected to the computer system so that the static driver can be used for testing, that is, prior to shipment of the product to an end user. For example, the hardware required to run the debugger could be placed on a feature card which is used (connected to the computer system) only if the debugger is needed early in the boot processes. A serial port could be provided on an ISA (Industry Standard Architecture) card that plugs into an ISA slot (or any optional slots) that a system has. The card would not be needed for the product, i.e., the end user would load the operating system on a computer that might lack the card. In this manner, an operating system can be tested more thoroughly and efficiently and yet still provide support for any operating system debugger without adding operating-system-specific costs to the model-specific code to the operating system's kernel. This approach allows greater flexibility and cost savings in hardware design, without sacrificing operating system debugability, since the operating system debugger can run on multiple I/O subsystems.

An additional use of the invention is, even when the static kernel debugger supports the hardware present (for example, serial ports), the PAL or other loadable application layer may choose to override the static debugger console and change to allow the debugger console to be elsewhere, such as a VGA display or remotely over a network, etc., simply by registering the defined interfaces.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, the illustrated embodiments apply to a UNIX-type operating system, but the invention is more generally applicable to any operating system having a debugger that must be used early in the system initialization. Also, the present invention contemplates other methods for passing information to the kernel about whether appropriate debugging hardware is present—for example, instead of the firmware passing the flag, a flag could be passed by an executable file residing in the boot image (see U.S. patent application Ser. No. 08/818,985. It is therefore contemplated that such modifications can be made without departing from the spirit or scope of the present invention as defined in the appended claims.

We claim:

1. A method of providing software support for a hardware device which is connected to a computer and used as an output device in debugging an operating system which is to be loaded on the computer, comprising the steps of:

loading a core portion of the operating system onto the computer, the core portion of the operating system including a default driver for supporting a first type of output devices for a debugger program; and determining whether any hardware device which is connected to the computer is of the first type of output devices and, if not, loading a dynamic debugger extension for the hardware device.

2. The method of claim 1 comprising the further step of loading another portion of the operating system onto the computer, the other portion of the operating system including other hardware-specific components.

3. The method of claim 1 comprising the further step of connecting to the computer a output device which is of the first type of output devices, prior to said determining step.

4. The method of claim 1 wherein said step of loading a dynamic debugger driver for the hardware device includes the further step of selecting one particular dynamic debugger driver out of a plurality of dynamic debugger drivers, the particular dynamic debugger driver being associated with the hardware device.

5. The method of claim 1 wherein the computer has firmware that can detect whether a hardware device is connected to the computer that is of the first type of output devices, and comprising the further step of the firmware passing information to the core portion of the operating system regarding whether any hardware device connected to the computer is of the first type of output devices.

6. The method of claim 1 further comprising, prior to said loading step, the step of running a program on the computer which determines whether a hardware device is connected to the computer that is of the first type of output devices, and comprising the further step of passing information from the program to the core portion of the operating system regarding whether any hardware device connected to the computer is of the first type of output devices.

7. The method of claim 1 wherein the computer is a UNIX-type workstation and said step of loading the core portion of the operating system includes loading a kernel into a memory device of the computer, the kernel having the default driver bound thereto.

8. The method of claim 2 wherein the computer is a UNIX-type workstation and said step of loading the other portion of the operating system includes loading a boot filesystem into a memory device of the computer, the boot filesystem having the other hardware-specific components.

9. A method of providing software support for a hardware device which is connected to a computer and used as an output device in debugging an operating system which is to be loaded on the computer, comprising the steps of:

loading a core portion of the operating system onto the computer, the core portion of the operating system including a default driver for supporting a first type of output devices for a debugger program; and thereafter loading a remaining portion of the operating system, the remaining portion of the operating system including a dynamic debugger extension for a hardware device which is not of the first type of output devices.

10. An operating system for a computer, comprising:

storage media that is readable by one or more input devices of the computer;

a core portion residing on the storage media, including a default driver for supporting a first type of output devices for a debugger program; and a supplementary portion residing on the storage media, including a dynamic debugger driver supporting a hardware device which is not of the first type of debugger devices, such that the dynamic debugger driver may be loaded in response to a determination that a hardware device is connected to the computer that is not of the first type of output devices.

11. The operating system of claim 10 wherein said supplementary portion further includes other hardware-specific components.

12. The operating system of claim 10 wherein said supplementary portion includes a plurality of dynamic debugger drivers each associated with different types of output devices.

13. The operating system of claim 10 wherein:

the operating system is adapted for a computer having firmware which seeks and loads the operating system; and said core portion includes instructions for receiving information from the firmware regarding whether any hardware device connected to the computer is of the first type of output devices.

14. The operating system of claim 10 wherein:

the computer is a UNIX-type workstation having a memory device; and said core portion includes a kernel to be loaded into the memory device, the kernel having the default driver bound thereto.

* * * * *

UNITED STATES PATENT AND TRADEMARK OFFICE
CERTIFICATE OF CORRECTION

PATENT NO. : 5,958,049
DATED : September 28, 1999
INVENTOR(S) : Mealey et al.

It is certified that error appears in the above-indentified patent and that said Letters Patent is hereby corrected as shown below:

Column 4, Line 43 please insert -- that -- after "except".

Signed and Sealed this

Twenty-fourth Day of October, 2000

Attest:

Q. TODD DICKINSON

Attesting Officer

Director of Patents and Trademarks